United States Patent
MacNeille et al.

(10) Patent No.: US 11,634,006 B2
(45) Date of Patent: Apr. 25, 2023

(54) METHODS AND APPARATUS FOR VEHICLE CLIMATE CONTROL USING DISTRIBUTED SENSORS

(71) Applicant: Ford Motor Company, Dearborn, MI (US)

(72) Inventors: Perry Robinson MacNeille, Lathrup Village, MI (US); Omar Makke, Lyon Township, MI (US); Yimin Liu, Ann Arbor, MI (US); Jeffrey Yeung, Canton, MI (US); Oleg Yurievitch Gusikhin, Commerce Township, MI (US)

(73) Assignee: Ford Motor Company, Dearborn, MI (US)

( * ) Notice: Subject to any disclaimer, the term of this patent is extended or adjusted under 35 U.S.C. 154(b) by 284 days.

(21) Appl. No.: 16/487,460

(22) PCT Filed: Feb. 23, 2017

(86) PCT No.: PCT/US2017/019115
§ 371 (c)(1),
(2) Date: Aug. 21, 2019

(87) PCT Pub. No.: WO2018/156136
PCT Pub. Date: Aug. 30, 2018

(65) Prior Publication Data
US 2020/0062074 A1    Feb. 27, 2020

(51) Int. Cl.
*B60W 10/30* (2006.01)
*B60W 40/02* (2006.01)
(Continued)

(52) U.S. Cl.
CPC ....... *B60H 1/00735* (2013.01); *B60H 1/0073* (2019.05); *B60W 10/30* (2013.01);
(Continued)

(58) Field of Classification Search
CPC ............ B60H 1/00735; B60H 1/0073; B60H 1/00742; B60H 1/008; B60H 1/00971;
(Continued)

(56) References Cited

U.S. PATENT DOCUMENTS 2,130,430 A * 9/1938 Maginnis .............. F25D 17/005
237/28
5,004,487 A * 4/1991 Kowalczyk .......... B60H 3/0616
96/135
(Continued)

FOREIGN PATENT DOCUMENTS

CA     2623996 C  *  6/2010
CN   101311638 A  * 11/2008  ......... B60H 1/00735
(Continued)

OTHER PUBLICATIONS

D. Lohani and D. Acharya, "Real time in-vehicle air quality monitoring using mobile sensing," 2016 IEEE Annual India Conference (INDICON), 2016, pp. 1-6 (Year: 2016).*
(Continued)

*Primary Examiner* — Cuong H Nguyen
(74) *Attorney, Agent, or Firm* — Brandon Hicks; Hanley, Flight & Zimmerman, LLC

(57) ABSTRACT

Methods and apparatus for vehicle climate control using distributed sensors are disclosed. A disclosed example method includes receiving data from sensors distributed within a vehicle at a first controller, processing the data at the first controller to identify an event associated with the interior of the vehicle and sending an instruction based on the event from the first controller to a second controller of the vehicle to affect an operation of a climate control system of the vehicle.

20 Claims, 10 Drawing Sheets

(51) Int. Cl.
*B60H 1/00* (2006.01)
*B60W 50/00* (2006.01)
*H04W 4/02* (2018.01)
*H04W 8/24* (2009.01)

(52) U.S. Cl.
CPC .............. *B60H 2001/00733* (2019.05); *B60W 2050/0065* (2013.01); *B60W 2050/0075* (2013.01); *B60W 2556/45* (2020.02); *H04W 4/023* (2013.01); *H04W 8/24* (2013.01)

(58) Field of Classification Search
CPC ............ B60H 1/00828; B60H 1/00871; B60H 1/00821; B60W 10/30; B60W 50/0065; B60W 2050/0077; B60R 16/037; B65H 2406/121; B41J 2/04566; B29C 49/6845
USPC ............................................ 701/36; 165/222
See application file for complete search history.

(56) References Cited

U.S. PATENT DOCUMENTS

| | | | |
|---|---|---|---|
| 6,868,900 | B2 | 3/2005 | Dage et al. |
| 8,370,020 | B2 | 2/2013 | Bauman et al. |
| 8,751,065 | B1* | 6/2014 | Kato ...................... B60R 16/037 701/2 |
| 9,567,077 | B2* | 2/2017 | Mullan ................... H04L 67/12 |
| 9,709,007 | B2* | 7/2017 | Dudar .................... F02D 41/144 |
| 9,796,239 | B2* | 10/2017 | Connell ................... B60H 1/03 |
| 10,032,453 | B2* | 7/2018 | Tzirkel-Hancock ... H04R 5/023 |
| 11,214,119 | B2* | 1/2022 | MacNeille ......... B60H 1/00771 |
| 11,337,404 | B2* | 5/2022 | Seta ....................... A01K 1/0236 |
| 2008/0115837 | A1 | 5/2008 | Gray |
| 2009/0058593 | A1* | 3/2009 | Breed ............... B60R 21/01552 340/5.2 |
| 2014/0229059 | A1* | 8/2014 | Surnilla ............. B60H 1/00742 701/1 |
| 2014/0310075 | A1* | 10/2014 | Ricci ....................... B60R 25/00 705/13 |
| 2015/0136376 | A1* | 5/2015 | Niemann ............... B60H 1/008 165/222 |
| 2015/0210287 | A1* | 7/2015 | Penilla ................ G06F 3/04842 701/49 |
| 2015/0234387 | A1* | 8/2015 | Mullan ................ G05D 1/0088 701/28 |
| 2017/0323639 | A1* | 11/2017 | Tzirkel-Hancock ......................... H04M 1/6075 |
| 2018/0079278 | A1* | 3/2018 | Kirpichnikov ..... B60H 1/00742 |
| 2018/0117988 | A1* | 5/2018 | Sarnia ................... G01N 27/048 |
| 2020/0408425 | A1* | 12/2020 | Zchori ................... F24F 3/1423 |
| 2022/0065457 | A1* | 3/2022 | Bailey .................... H05B 3/746 |

FOREIGN PATENT DOCUMENTS

| | | | | |
|---|---|---|---|---|
| CN | 101870241 | A * | 10/2010 | ......... B60H 1/00735 |
| CN | 203533806 | | 4/2014 | |
| CN | 204674332 | | 9/2015 | |
| CN | 205202685 | | 5/2016 | |
| CN | 105780418 | A * | 7/2016 | |
| DE | 10113800 | A1 * | 10/2001 | ......... B60H 1/00735 |
| JP | 2022073922 | A * | 5/2022 | ............... B60H 1/00 |
| WO | 2013072926 | | 5/2013 | |

OTHER PUBLICATIONS

"Recent advances in performance enhancement techniques and the perspective of solar energy for automobile air-conditioning system—a critical review" by Hemantchandra N. Patel et al. from https://doi.org/10.1016/j.solener.2022.06.003 (Year: 2022).*
"Autonomous vehicles opportunities for cities air quality" by Sandra Rafael et al, from https://doi.org/10.1016/j.scitotenv.2020.136546 (Year: 2020).*
"Vehicle interior air quality conditions when travelling by taxi" by Teresa Moreno et al., from https://doi.org/10.1016/j.envres.2019.02.042, Environmental Research, vol. 172, May 2019, pp. 529-542 (Year: 2019).*
"Real-Time In-Vehicle Air Quality Monitoring System Using Machine Learning Prediction Algorithm" by Chew Cheik Goh et al, Sensors 2021, 21(15), 4956 (Year: 2021).*
Energy-saving effect of utilizing recirculated air in electric vehicle air conditioning system by Leyan Pan et al., International Journal of Refrigeration; vol. 102, Jun. 2019, pp. 122-129 (Year: 2019).*
Charthad et al. "System-Level Analysis of Far Field Radio Frequency Power Delivery for mm-Sized Sensor Nodes," IBEE Transactions on Circuits and Systems—I Regular Papers, vol. 63, No. 2, Feb. 2016, (12 pages).
Lim, et al. "MEMS Based Integrated Particle Detection Chip For Real Time Environmental Monitoring," Department of Mechanical Engineering, Yonsei University, Jan. 2006, (4 pages).
China National Intellectual Property Administration, "Notification of First Office Action", issued in connection with Chinese Patent Application No. 2017800872666, dated May 23, 2022, (15 pages). [English translation included].
China National Intellectual Property Administration, "Notification of Second Office Action," issued in connection with Chinese Patent Application No. 2017800872666, dated Jan. 19, 2023, 16 pages.

* cited by examiner

METHODS AND APPARATUS FOR VEHICLE CLIMATE CONTROL USING DISTRIBUTED SENSORS

FIELD OF THE DISCLOSURE

This disclosure relates generally to climate control systems and, more particularly, to vehicle climate control using distributed sensors.

BACKGROUND

In recent years, vehicle climate control systems (e.g., Heating, Ventilation and Air Conditioning (HVAC) systems) have become more sophisticated. In particular, climate control systems in vehicles often allow for individual adjustments to ensure both a driver and passenger(s) are comfortable. For example, air quality sensors near vents may measure pollutants in the air and send a signal to the climate control system. The climate control system may respond to the signal by actuating vents to cool or heat the vehicle using air within the cabin (i.e., recirculated air) to isolate the occupants of the vehicle from the outside pollutants.

SUMMARY

An example method includes receiving data from sensors distributed within a vehicle at a first controller and processing the data at the first controller to identify an event associated with the interior of the vehicle. The example method also includes sending an instruction based on the event from the first controller to a second controller of the vehicle to affect an operation of a climate control system of the vehicle.

An example apparatus includes a first controller to receive data from sensors distributed within a vehicle, process the data to identify an event associated with the interior of the vehicle and send an instruction based on the event. The example apparatus also includes a second controller of the vehicle to affect an operation of a climate control system of the vehicle based on the instruction.

An example tangible computer-readable medium includes instructions that, when executed, cause a processor to at least receive data from sensors distributed within a vehicle, process the data to identify an event associated with the interior of the vehicle and send an instruction based on the event to affect an operation of a climate control system of the vehicle.

Figure 1:
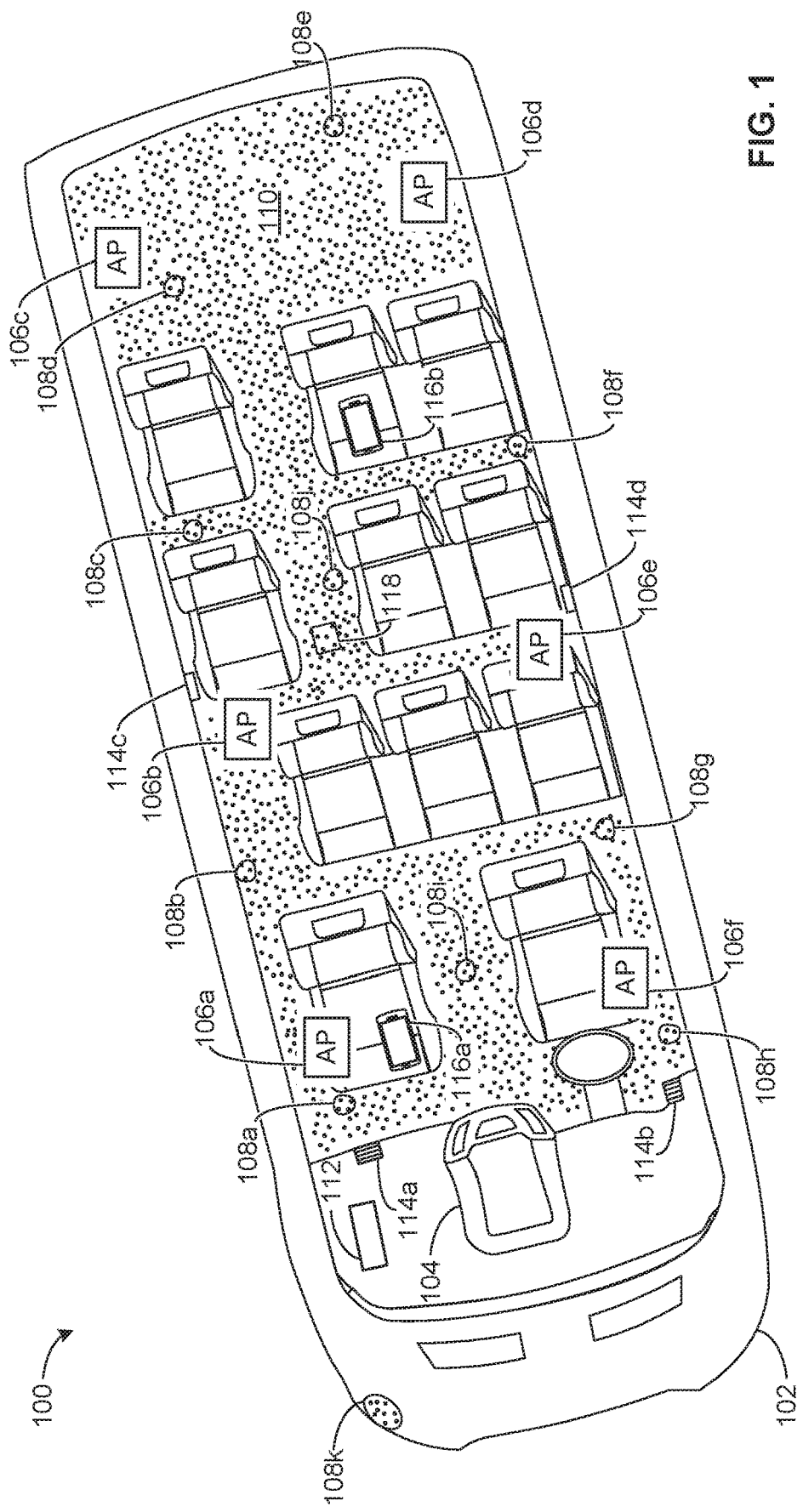
FIG. 1 depicts an example vehicle climate control system in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus for vehicle climate control using distributed sensors are disclosed. Known climate control systems of vehicles may be limited in terms of control as well as accuracy in detecting or measuring vehicle cabin conditions. Such known systems may only measure temperature at one or two locations within the vehicle cabin, humidity at a single location, use a single sensor to measure an incident pollutant from outside air, etc. As a result, many known vehicle climate control systems are unable to measure or detect temperature at many locations within a vehicle cabin, temperature gradients across these locations, air quality variations throughout the vehicle cabin, etc. Also, many known vehicle climate control systems do not employ open-sourced development and/or an ability to develop specialized applications and/or later added compatibility with newer sensors and/or sensory systems.

The examples described herein enable more effective and customizable control of vehicle climate control systems. More specifically, the examples described herein, may be used to detect localized conditions or events within a vehicle interior or cabin and to change or affect an operation of a climate control system of the vehicle to mitigate or otherwise respond to the detected conditions or events. For example, the examples described herein may detect an event such as a spill of liquid within the vehicle cabin, a localized temperature event such as identifying an area of the vehicle cabin that is relatively warmer or cooler than the remainder of the vehicle cabin due to sunlight, an open window, etc., detection of an air pollutant such as cigarette smoke, poor quality outside air entering the vehicle cabin via a window or outside air vent, food odors, etc. In response to detection of such events, the examples described herein may send one or more instructions to a controller of a climate control system of the vehicle to affect an operation of the climate control system in a manner that serves to mitigate, alleviate, or otherwise address the detected events.

For example, based on data received from the sensors distributed within a cabin of a vehicle, the controller may identify wetness in the carpet at a temperature that could lead to mold and bacteria growth. When this occurs, the controller may send one or more instructions to operate the climate control system to dry the carpet at the location of the wet carpet. Additionally, the controller may cause the climate control system to operate in full recirculation mode (e.g., roll up windows, close an inlet door, operate a blower) and/or full dehumidification (e.g., operate a heater core and an evaporator). Further, vent doors may be directed to focus warm, dry air on the carpet to dry the carpet in a short amount of time.

To detect or measure localized conditions or events throughout a vehicle cabin, the examples described herein employ sensors distributed throughout the vehicle cabin. Additionally, the examples described herein may also use information or data from sources external to the vehicle such as information received from web services, etc. to generate instruction(s) that affect the operation of the vehicle climate control system. For example, the web services may provide virtual sensor information, driver/occupant preference data, and/or external condition data (e.g., weather information, traffic, external air conditions, pollution patterns, allergy/pollen information, etc.) to the controller for processing. In some examples, virtual sensor information may include sensor data obtained from other vehicle(s), other location(s), base station(s) (e.g., weather stations) and/or web services that forward data/information to a virtual sensor network. As a result, the sensor data from virtual sensors can be used by a mobile device. The controller may process the external condition data and identify high pollen counts in an area toward which the vehicle is traveling, for example. As a result, the controller may instruct the climate control system to actuate vents and recirculate internal air prior to passing through the identified area.

In the examples described herein, the sensors distributed throughout the vehicle cabin may be passively powered, wireless sensors that sense temperature(s), humidity, air contaminants or pollutants, etc. These distributed sensors may communicate with a controller of the vehicle via one or more access point devices, which serve to route the communications of the sensors and may also provide electrical power to the sensors via signals that are transmitted (e.g., broadcast) by the access point devices (also generally referred to herein as "access points") to the sensors.

The vehicle controller in communication with the access points may receive/obtain sensor data, process/filter sensor data and/or data associated with the sensor data (e.g., control inputs based on the sensor data) to identify events. As noted above, events such as localized temperature anomalies, spills, air pollutants, etc. may be detected or measured via one or more of the sensors and the sensors may communicate corresponding measurement data to a controller of the vehicle via the access point(s). The controller in communication with the access point(s) may receive the measurement data and process the measurement data to identify the event(s) and corresponding location(s) of the events. As described in greater detail below, the location(s) of the identified event(s) may be determined by determining the locations of the sensors that detected the conditions associated with the event(s). In other words, because the examples described herein utilize sensors distributed throughout the cabin of the vehicle, each of the sensors collects data corresponding to a relatively well-defined localized area within the vehicle cabin. As such, when a sensor detects a condition associated with an event, the examples described herein may use the location of the sensor as a proxy or an approximation for the location of the event. In some examples, the location of each sensor may be known at the time of manufacture of the vehicle or at the time of installation of the sensor. In those examples, the location data may be stored in the controller and/or access points. In other examples, the access points and/or the controller may determine the location(s) of the sensor(s) associated with an event by measuring signal strength and arrival time of high frequency signals (e.g., 24/64 GHz signals) transmitted by the sensors. To locate the sensors, the access points may use geolocation, differential time of arrival and/or range-triangulation. The access points may determine their locations in a similar manner.

In the examples described herein, the controller in the vehicle may identify a personal mobile device (e.g., a mobile phone, a tablet, a laptop, etc.) is present and communicatively coupled to the controller. In these examples, the personal mobile device may be communicatively coupled via a universal serial bus (USB) connection, Bluetooth wireless communications, etc. to the vehicle controller. The controller may interact with an application on the personal mobile device to identify the personal mobile device and retrieve user parameters corresponding to the person associated with the personal mobile device to affect an operation of the climate control system based on the user parameters. For example, temperatures settings, an allergy, or any other vehicle cabin preferences and/or personal information may be communicated from the personal mobile device to the controller of the vehicle (e.g., the same controller with which the access points and, thus, sensors communicate).

Alternatively, the presence and location of a person (e.g., a driver, passenger, etc.) may be detected using one or more of the sensors distributed throughout the cabin of the vehicle. For example, high radiant heat and/or carbon dioxide detected by sensors proximate the driver's seat may be used to determine that a person is located in the driver's seat. In these examples, the controller in the vehicle may prompt the detected person for any climate control preferences or may use default values associated with typical values found to be comfortable by the average person.

FIG. 1 depicts an example vehicle climate control system 100 in accordance with the teachings of this disclosure. The example vehicle climate control system 100, which is implemented in an example vehicle 102, includes an example vehicle controller 104, access points 106*a-f*, sensors 108*a-k* distributed throughout a cabin 110 of the vehicle 102 and external to the cabin 110 of the vehicle (e.g., the sensor 108*k*), and a climate controller 112 to direct control of vents 114*a-d* as well as other devices of the climate control system 100 as described in connection with FIG. 6 below. As shown, one or more personal mobile devices 116*a-b* may be present (e.g., carried by one or more respective people) within the vehicle cabin 110 and, as described in more detail below, may interact with the vehicle controller 104.

To direct control of the vehicle climate control system 100, the vehicle controller 104 sends signals to the access points 106 initiating the collection of measurement data (e.g., temperatures, humidity values, solar radiation levels, air movements, chemical concentrations, etc.) from the sensors 108. More specifically, in response to a signal from the vehicle controller 104 to collect measurement data, each access point 106 beacons or broadcasts a high frequency (e.g., a 20-24 GHz) signal to one or more of the sensors 108 associated with that access point 106. In some examples, each of the sensors 108 may be assigned to communicate via a respective one of the access points 106. In such examples, each of the sensors 108 is only responsive to communications from its assigned access point 106 and, thus, is not responsive to the beacons or broadcast signals from other access points 106. In other examples, the sensors 108 may communicate via different ones of the access points 106 at different times depending, for example, on which access point signal may have been first received, which access point signal is currently strongest at each access point 106, etc.

In some examples, the sensors 108 are passive devices that obtain electrical power from the signals broadcast by the access points 106. In these examples, upon receiving a signal from an access point 106, a sensor 108 assigned to that access point 106, or otherwise configured to communicate via that access point 106, may become active (e.g., exit a sleep mode) and transmit measurement data to the access point 106. The measurement data collected by the access points 106 from the sensors 108 may be associated with sensor location information. For example, upon receiving measurement data from a sensor 108, an access point 106 may use the arrival time of the signal from the sensor 108 and/or the strength of the signal received from the sensor 108 to determine a location of the sensor 108 (e.g., within the cabin 110 of the vehicle 102 or external to the cabin 110 of the vehicle in the case of the sensor 108k). Alternatively, the sensor 108 may provide a location code or information together with any measurement data sent to the access point 106, or an identification code of the sensor 108 may be used to look up a location of the sensor 108 stored in the access point 106 or the vehicle controller 104. In examples where the locations of the sensors 108 are provided by the sensors 108 or stored in the access points 106 or the vehicle controller 104, such location information may be established at the time the vehicle 102 is manufactured or at the time the sensors 108 are installed in the vehicle 102. For example, the sensor 108 may be programmed with a location within the vehicle 102. In other examples, the access point 106 may associate a network address of the sensor 108 with a location.

The access points 106 send measurement data together with any sensor location information to the vehicle controller 104 for processing. The vehicle controller 104 may process the received data to identify one or more environmental conditions, changes and/or events within or external to the cabin 110 of the vehicle 102 and the corresponding locations of those identified conditions, changes or events. In response to identifying certain environmental conditions, changes or events within or external to the cabin 110, the vehicle controller 104 may send instructions, commands or signals to the climate controller 112 to affect the operation of the climate control system 100. In particular, the climate controller 112 may send one or more instructions, commands or signals to affect the operation of the climate control system 100 in locations of the cabin 110 corresponding to the location(s) of the identified environmental changes, conditions or events.

In one example, the vehicle controller 104 sends signals to the access points 106 initiating the collection of measurement data from the sensors 108. Specifically, each access point 106 broadcasts a high frequency signal to one or more of the sensors 108, the sensors 108 become active, obtain measurements and transmit measurement data to the access points 106. If a passenger in the vehicle 102 has spilled liquid (e.g., a beverage) in a location 118 of the vehicle cabin 110, the sensor 108j may detect a wetness of the carpeting (e.g., via a humidity change) near the location 118. In turn, the access point 106b, which is nearest to the sensor 108j, may receive the measurement data (e.g., the humidity data) from the sensor 108j and send this measurement data to the vehicle controller 104. The vehicle controller 104 may process this measurement data together with location information (e.g., the location of the sensor 108j) to generate one or more commands that are sent to the climate controller 112. The one or more commands received by the climate controller 112 may command additional ventilation to be provided to the location 118 via the vent(s) 114c and/or 114d, thereby facilitating a more rapid drying of the location 118.

In some examples, the vehicle controller 104 may identify the presence of a passenger along with the mobile device 116b which, in some examples, is communicatively coupled to the vehicle controller 104. In examples when the passenger is present, prior to operating the vents 114c, 114d, the vehicle controller 104 may prompt the passenger via the mobile device 116b to authorize the operation of the vents 114c, 114d. If the request is authorized, the climate controller 112 operates the vents 114c, 114d to dry the carpet in the location 118. However, if the request is not authorized, the vehicle controller 104 may postpone the operation until the passenger is no longer within the vehicle 102.

In the described examples, the vehicle controller 104 directly controls (e.g., via control signals, input command signals, etc.) the climate controller 112. However, in other examples, the mobile devices 116 relay the sensor data from the access points 106 to the example vehicle controller 104 which, in turn, directs the climate controller 112. Additionally or alternatively, the example vehicle controller 104 at least partially controls (e.g., in conjunction with the mobile devices 116) the climate controller 112 based on other internal sensors (e.g., wired sensors) of the vehicle 102. In such examples, the mobile devices 116 may convey sensor data to the vehicle controller 104.

While the distributed sensors 108 are shown in this example, any appropriate number, type and/or combination of sensors may be used. For example, sensors, which may be external (e.g., an external sensor) or internal (e.g., an internal sensor) to a vehicle, can include, but are not limited to, particulate sensors (e.g. biological sensors, smoke sensors that detect polycyclic aromatic hydrocarbons, detectors of soot, water, mineral or oil, etc.), chemical/gas sensors (e.g., humidity, biological byproducts, plastic evaporation, combustion byproducts, etc.), thermodynamic sensors (e.g., temperature sensors, barometric sensors, solar radiation and/or position sensors, three-dimensional cabin airflow), and/or biometric sensors (e.g., skin temperature, metabolic rate, ketosis breath, breath, infrared, facial expressions, spectral analysis, etc., electrocardiogram (ECG/EKG), brain waves, driver awakeness (eyes), erythema, etc.). In some examples, the biometric sensors may be implanted under the skin of an individual and/or contained within wearables (e.g., clothing, bags, etc.).

Figure 2:
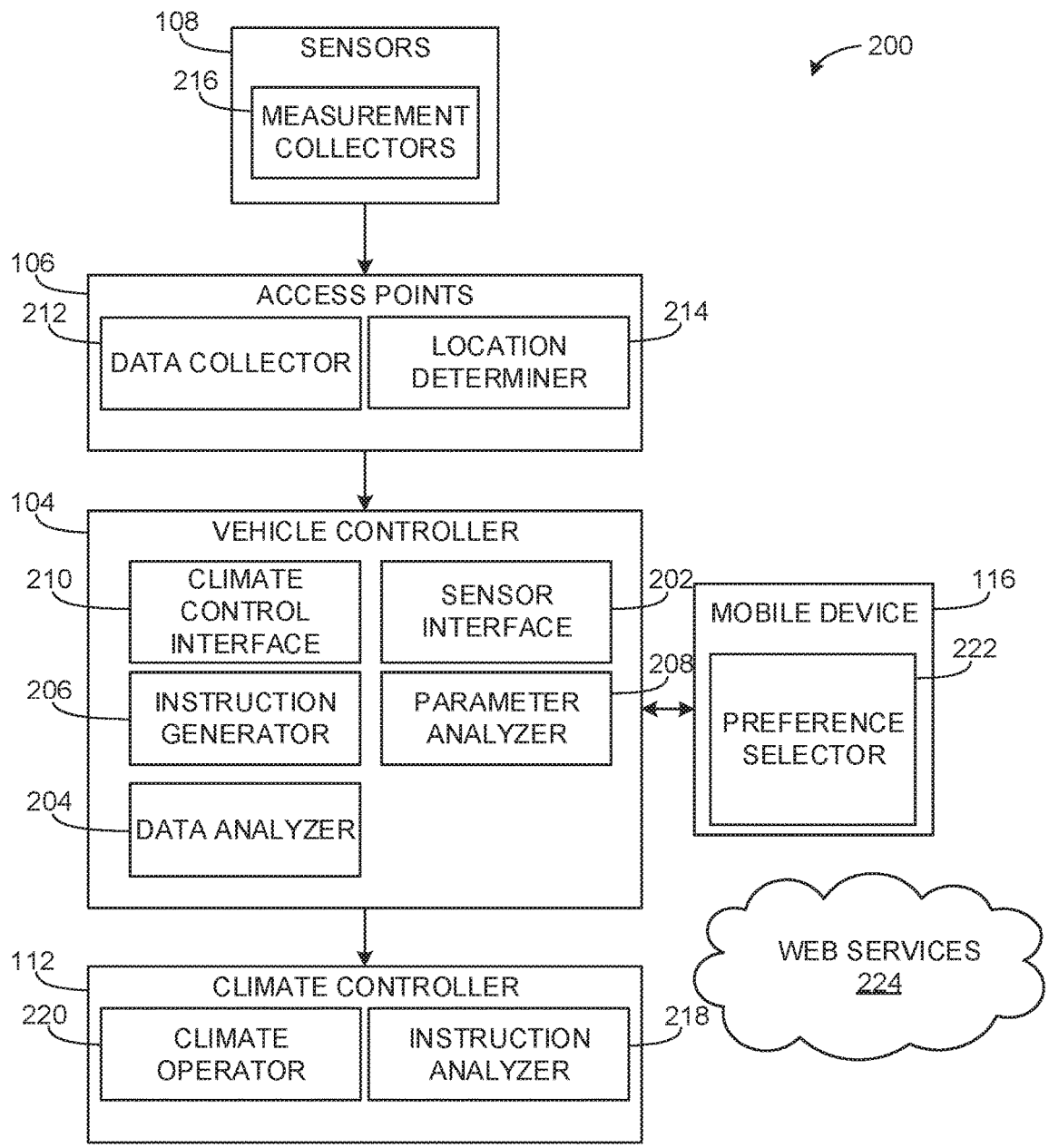
FIG. 2 is a schematic representation of an example vehicle climate control system that may be used to implement the example vehicle climate control system of FIG. 1.

FIG. 2 is a schematic representation of an example vehicle climate control system 200 that may be used to implement the example vehicle climate control system 100 of FIG. 1. The example vehicle climate control system 200 includes the vehicle controller 104, the access points 106, the sensors 108, the climate controller 112 and the mobile devices 116. The example vehicle controller 104 includes a sensor interface 202, a data analyzer 204, an instruction generator 206, a parameter analyzer 208 and a climate control interface 210. The example access points 106 include a data collector 212 and a location determiner 214. Each of the example sensors 108 includes a measurement collector 216. The example climate controller 112 includes an instruction analyzer 218 and a climate operator 220. Each of the example mobile devices 116 includes a preference selector 222. Additionally, as described in greater detail below, the vehicle climate control system 200 may also access one or more web services 224 to perform various climate control functions.

The measurement collectors 216 of the illustrated example collect measurement data related to the vehicle 102. In particular, the measurement collectors 216 of the sensors 108 measure environmental conditions of the interior and exterior of the vehicle 102 for processing by the vehicle controller 104. To measure a condition associated with an event, the vehicle controller 104 initiates the collection of measurement data by transmitting a signal to the access points 106. According to the illustrated example, the access points 106 beacon the sensors 108, which activates the measurement collectors 216 to collect measurement data.

Within each of the access points 106, the measurement data transmitted by the measurement collectors 216 is collected by a respective data collector 212. The location determiners 214 measure arrival time and signal strength of signals of sensors 108 from which measurement data is received to determine the respective locations of the sensors 108. Alternatively, the location determiner 214 may identify the locations of the sensors 108 using identification codes received with the measurement data where each code corresponds to a location within the vehicle 102. Each access point 106 may transmit any received measurement data together with associated or corresponding location information to the vehicle controller 104 for further processing.

The measurement data and location information transmitted by the access points 106 is received by the sensor interface 202 of the vehicle controller 104. The sensor interface 202 then conveys the measurement data and location information to the data analyzer 204 for processing. The data analyzer 204 processes the measurement data and the location information to detect and identify an event and a location of the event. To detect if an event has occurred, the data analyzer 204 may process the measurement data and location information and compare the measurement data and the location information to one or more thresholds and/or combinations of thresholds corresponding to known types of events. For example, the measurement data may indicate an abnormally high humidity level in a certain location of the vehicle cabin 110, indicating the likelihood of a spill of a liquid (e.g., a beverage) at that location. In another example, the measurement data may indicate an abnormally high level of an airborne contaminant in a particular location within the vehicle cabin 110, indicating the possibility of a food odor or the like. Various event scenarios may be stored within the vehicle controller 104 in the form of thresholds associated with various measurement parameters (e.g., temperature, humidity, particulate or contaminant levels, etc.) and, if appropriate, locations associated with those scenarios. Thus, the data analyzer 204 may access the threshold and/or the location information associated with these scenarios and evaluate the received measurement data and location information against (e.g., compare the measurement data to) these thresholds and locations to find a likely match.

Additionally or alternatively, the data analyzer 204 may analyze external conditions of the vehicle 102, which may be received from one or more of the sensors 108 and/or the web services 224, to identify an event. For example, the web services 224 may indicate heavy construction, a large industrial plant, a high pollen level, a high smog level, etc. in an area toward which the vehicle 102 is traveling. The data analyzer 204 may, for example, associate such conditions as scenarios in which it is desirable to operate the climate control system 200 in recirculation mode to isolate passengers in the vehicle 102 from irritating pollutants.

If an event is detected by the data analyzer 204, information indicative of the identified event is conveyed to the instruction generator 206, which may generate one or more instructions based on the identified event to be sent to the climate controller 112 via the climate control interface 210 to affect an operation of the climate control system 200 to mitigate or otherwise respond to the event and/or change an environmental condition within the cabin 110 of the vehicle 102.

The parameter analyzer 208 analyzes preference data from the preference selectors 222 of the mobile devices 116 for information related to user parameters, for example, such as preferred temperatures. The parameter analyzer 208 forwards the user parameters to the instruction generator 206 for processing. The parameter analyzer 208 may receive personalized vehicle occupant information from the preference selectors 222, whereby the parameter analyzer 208 analyzes the vehicle occupant information to identify a desired environmental change for the cabin 110 of the vehicle 102. For example, the parameter analyzer 208 may identify the internal temperature of the vehicle is below a desired temperature of one of the passengers associated with one of the person mobile devices 116. In such an example, the parameter analyzer 208 sends the information to the instruction generator 206 for processing to generate one or more instructions that are sent to the climate controller 112 via the climate control interface 210 to instruct the climate controller 112 to affect an appropriate change the environment of the cabin 110 of the vehicle 102 (e.g., change the temperature to a desired temperature). Additionally, the parameter analyzer 208 may store data on the mobile device 116 carried by a passenger from one vehicle to another. For example, a passenger may use multiple vehicles to commute to work. Each time the passenger switches to another vehicle, the parameter analyzer 208 may access user parameters from the preference selector 222 of the mobile device 116, and analyze the user parameters to identify a desired environmental change for the vehicle. In some examples, when one or more passengers with a mobile device 116 that stores preferences in the parameter analyzer 208 are present, the parameter analyzer 208 may use social decision-making algorithms to identify the best environmental change (e.g., temperature change) for the entire vehicle and/or for individual locations of the passengers.

The climate controller 112 analyzes instructions received from the vehicle controller 104 to determine the steps necessary to operate the climate control system 200. More specifically, the instruction analyzer 218 analyzes the instructions to identify the components of the climate control system 200 that will be involved in carrying out the instructions and how those components will be operated. For example, in carrying out a response in the spilled beverage example described above, the instruction analyzer 218 may identify the vents 114c, 114d and a blower motor are to be operated at full capacity.

The instruction analyzer 218 analyzes instructions received by the climate controller 112 as noted above and may send commands or signals to the climate operator 220 to operate various components of the climate control system 200. For example, the climate operator 220 may receive commands and/or signals from the instruction analyzer 218 to actuate the vents 114, operate a blower motor or fan, etc. to change the environmental condition of the vehicle 102.

While an example manner of implementing the vehicle climate control system 100 of FIG. 1 is illustrated in FIG. 2, one or more of the elements, processes and/or devices illustrated in FIG. 2 may be combined, divided, re-arranged, omitted, eliminated and/or implemented in any other way. Further, the example data analyzer 204, the example instruction generator 206, the example parameter analyzer 208, the example data collector 212, the example location determiner 214, the example measurement collector 216, the example instruction analyzer 218, the example climate operator 220, the example preference selector 222 and/or, more generally, the example vehicle climate control system 200 of FIG. 2 may be implemented by hardware, software, firmware and/ or any combination of hardware, software and/or firmware. Thus, for example, any of the example data analyzer 204, the example instruction generator 206, the example parameter analyzer 208, the example data collector 212, the example location determiner 214, the example measurement collector 216, the example instruction analyzer 218, the example climate operator 220, the example preference selector 222 and/or, more generally, the example vehicle climate control system 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data analyzer 204, the example instruction generator 206, the example parameter analyzer 208, the example data collector 212, the example location determiner 214, the example measurement collector 216, the example instruction analyzer 218, the example climate operator 220, the example preference selector 222 is/are hereby expressly defined to include a tangible computer readable storage device or storage disk such as a memory, a digital versatile disk (DVD), a compact disk (CD), a Blu-ray disk, etc. storing the software and/or firmware. Further still, the example vehicle climate control system 200 of FIG. 2 may include one or more elements, processes and/or devices in addition to, or instead of, those illustrated in FIG. 2, and/or may include more than one of any or all of the illustrated elements, processes and devices.

Figure 3:
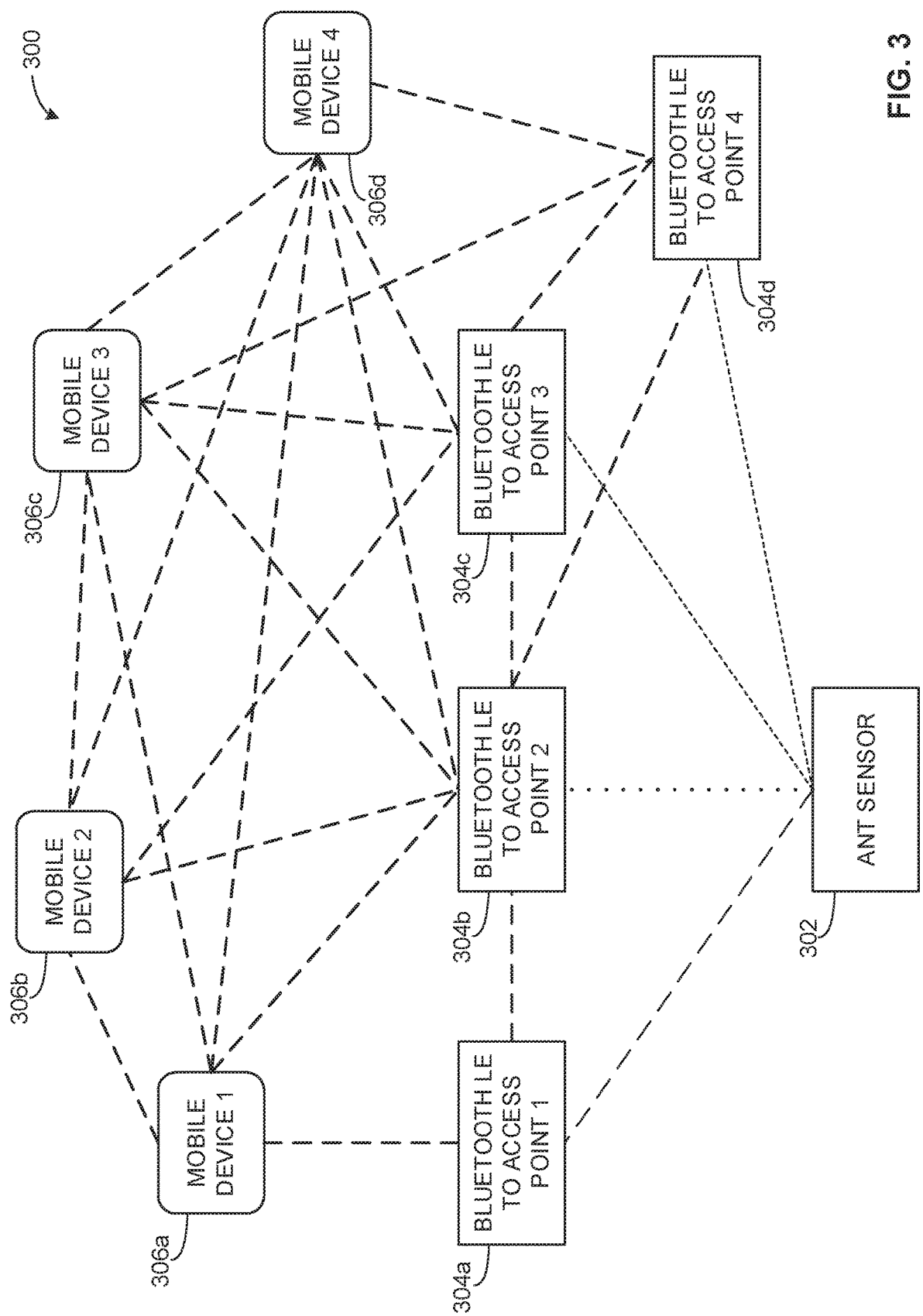
FIG. 3 is a schematic representation of an example sensor network that may be implemented with the examples disclosed herein.

FIG. 3 is a schematic representation of an example sensor network 300 that may be implemented with the examples disclosed herein. The example sensor network includes a sensor 302, access points 304a-d and mobile devices 306a-d. The sensor 302 may correspond to any of the sensors 108 of FIG. 1, the access points 304a-d may correspond to the access points 106a-e of FIG. 1, and the mobile devices 306a-d may generally correspond to the mobile devices 116a-b of FIG. 1.

The sensor 302 is a distributed sensor located within the interior or cabin 110 of the vehicle 102 and configured to communicate to a controller (e.g., the vehicle controller 104) via the access points 304. In some examples, a location of the sensor 302 is unknown and locations of the access points 304 are known. To locate the sensor 302, for example, the access points 304 broadcast a signal to the sensor 302, which powers the sensor 302 and initiates the collection of measurement data from the sensor 302. In the illustrated example, the sensor 302 sends a signal including measurement data to the access points 304. The access points 304a, 304b receive the signal from the sensor 302 and measure signal strength and arrival time to locate the sensor 302. The access points 304c, 304d are out of range from the sensor 302 and, thus, do not engage in location determination for the sensor 302. Additionally, the access points 304a, 304b communicate with each other to determine the strongest signal, indicating a location of the sensor 302. In the illustrated example, the signal sent to the access point 304b is the strongest and, thus, the known location of the access point 304b is utilized to locate the sensor 302. Alternatively, the sensor 302 may be installed with a location identifier stored within the sensor 302 and, when sending a signal to the access points 304, the location identifier may be sent to the access points 304, thereby eliminating the need for the access points 304 to determine the location using signal strength and/or arrival times of signals. In some examples, when a location of the sensor 302 is determined, the measurement data provided by the sensor 302 is tagged with a time the measurement occurred, geodetic coordinates associated with the measurement (e.g., Dearborn, Mich.) and vehicle coordinates of the measurement (e.g., driver seat).

The access points 304 communicate with each other to determine the location of the sensor 302 as well as the locations of the mobile devices 306. In the illustrated example, the access points 304 send location signals (e.g., Bluetooth LE, Wi-Fi, etc.) to the mobile devices 306 to determine locations of the mobile devices 306. The access points 304 measure signal strength and arrival time of signals received from the mobile devices 306 to determine where the mobile devices 306 are located within the vehicle 102. Alternatively, the mobile devices 306 may identify where they are located within the vehicle 102. For example, the vehicle controller 104 may prompt a user of the mobile device 306a to identify the current location of the mobile device 306a and the user may indicate the driver's seat as the current location of the mobile device 306a. Additionally, the mobile devices 306 communicate amongst each other to support the location determination. For example, the mobile devices 306 may send location signals and measure the responsive signals from the other mobile devices 306 to identify locations. In some examples, the vehicle controller 104 may instruct the climate controller 112 to change an environmental condition in the identified location of the mobile device 306.

Figure 4:
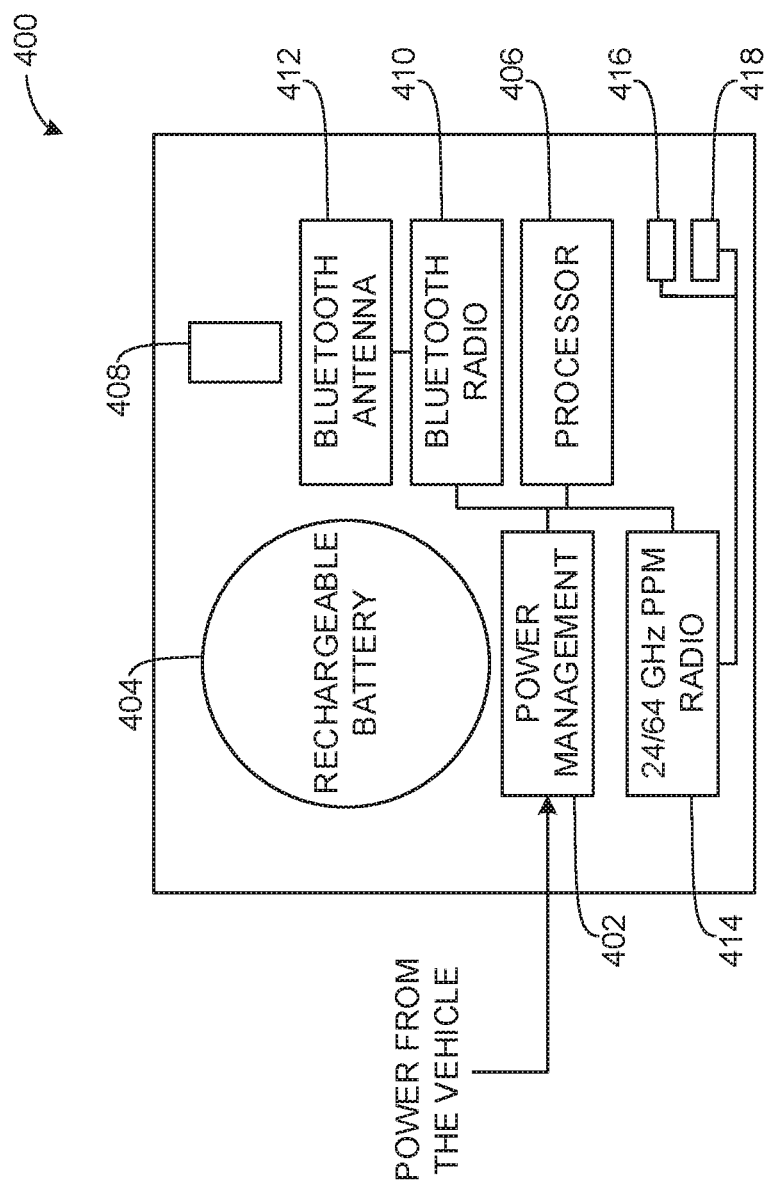
FIG. 4 depicts an example access point that may be implemented with the examples disclosed herein.

FIG. 4 depicts an example access point 400 that may be used to implement the examples disclosed herein. The example access point 400 includes a power management component 402, a rechargeable battery 404, a processor 406, a timing crystal 408, a Bluetooth radio 410, which includes a Bluetooth antenna 412, and a Pulse Position Modulation (PPM) radio 414, which includes a 24 GHz antenna 416 and a 64 GHz antenna 418.

The power management component 402 is used to power the access point 400. In the illustrated example, the power management component 402 receives power from the vehicle 102 via, for example, a circuit associated with lighting (e.g., a taillight circuit, a headlight circuit, etc.). Alternatively, the power management component 402 may utilize power from a direct connection to a power source (e.g., a battery) of the vehicle 102.

The rechargeable battery 404 powers the access point 400 by receiving and storing energy from the power management component 402. In some examples, the power management component 402 may utilize the rechargeable battery 404 to power the access point 400 when the vehicle is off (e.g., not in use).

The processor 406 coordinates the operations of all the components of the access point 400. In particular, the processor 406 facilitates the transmitting/receiving of high frequency signals. For example, the processor 406 initiates the collection of measurement data at the sensors 108. Additionally, the processor 406 processes signal data (e.g., signal strengths, arrival times, etc.) from the sensors 108 to determine locations of the sensors 108.

The timing crystal 408 is part of an electronic oscillator circuit that may be used to keep track of time. In some examples, the timing crystal 408 may enable the processor 406 to control the timing used to initiate transmitting and receiving signals. For example, the timing crystal 408 may be used to establish timing cycles (e.g., 2 second intervals) for beaconing sensors 108 within the vehicle 102.

The Bluetooth radio 410 works in conjunction with the Bluetooth antenna 412 to communicatively couple to devices within the vehicle 102. In some examples, the Bluetooth radio 410 may broadcast a signal and a mobile device may respond to the signal and pair with the access point 400 to transmit location data, for example.

The PPM radio 414 utilizes the 24 GHz antenna 416 to beacon and power sensors 108 within the vehicle 102 and the 64 GHz antenna to receive signals from the sensors 108.

In operation, processor 406 initiates a location beaconing sequence. The PPM radio 414 beacons the sensors 108 with a high frequency signal via the 24 GHz antenna 416. The sensors 108 wake up (i.e., become active), obtain measurements and transmit the measurement data to the access point 400 via high frequency signals. The 64 GHz antenna 418 receives the signals from the sensors 108 and transfer the data to the processor 406 for determination of a location based on signal strength and arrival time of the signal from the sensors 108. In some examples, The 64 GHz antenna 418 broadcasts wireless messages to the sensors 108 and, when powered, the sensors 108 may broadcast messages at 64 GHz. The messages from the sensors 108 may contain network addresses for the sensors 108 and the 64 GHz antenna 418. The communication between the 64 GHz antenna 418 and the sensors 108 can take several forms, such as request/response, representational state transfer, simple object access protocol, etc.

Figure 5:
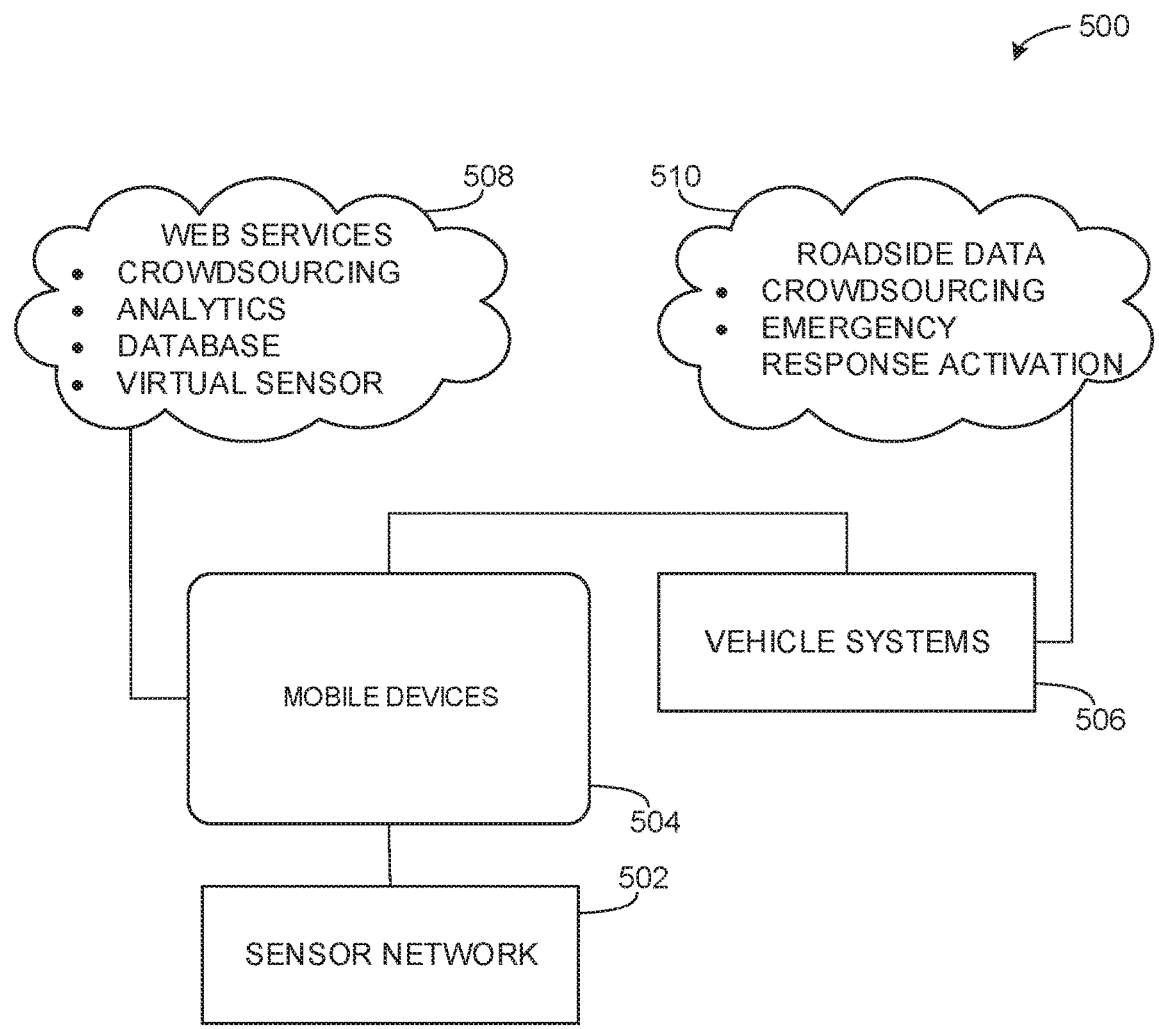
FIG. 5 is a schematic representation of an example virtual sensor network that may be implemented in conjunction with the examples disclosed herein.

FIG. 5 is a schematic representation of an example virtual sensor network 500 that may be implemented in conjunction with examples disclosed herein. The example virtual sensor network 500 includes a sensor network 502, mobile devices 504, vehicle systems 506, web services 508 and roadside data 510, all of which provide measured sensor data and/or analysis data related to the sensor data of the example virtual sensor network 500.

To provide location-based condition data and/or geography-based condition models, the sensor network 502, the mobile devices 504 and the vehicle systems 506 gather data from at least one of the web services 508 and/or the roadside data 510 to develop a geography-based model of conditions. As a result, location-based condition data may be transmitted to other vehicles so that each vehicle can appropriately operate a climate control system such as the climate control systems 100, 200 of FIGS. 1 and 2. More specifically, the web services 508 of FIG. 5 may correspond to the web services 224 of FIG. 2 and, thus, one or more climate control systems similar or identical to the climate control system 200 of FIG. 2 may obtain location-based condition data from the virtual sensor network 500 via the web services 224.

In some examples, the sensor network 502 transfers measurement data to the web services 508 via the mobile devices 504 to enable the virtual sensor network 500 to analyze (e.g., utilizing external data) the sensor data and return instructions (e.g., determined settings, recommended settings, etc.) based on the analysis. As a result, the web services 508 and/or the roadside data 510 compare and/or analyze transmitted sensor data to determine settings based on analyzing previous data and/or patterns. According to such examples, the settings (e.g., learned settings) are forwarded to the vehicle systems 506 so that the vehicle systems 506 can operate respective climate controllers such as the climate controller 112 of FIGS. 1 and 2.

In some examples, data measured at any vehicle communicatively coupled to the virtual sensor network 500 may be used to develop location-based condition data. For example, at least one vehicle may measure an external condition (e.g., an ambient temperature, a particulate reading) and relay that external condition along with a measured position (e.g., a GPS position), geodetic coordinates (WPS-84, UTM, etc.), and a location in vehicle coordinates of the respective vehicle so that the location-based condition data can be collected for use by other vehicles coupled to the virtual sensor network 500. In some examples, the location-based condition data is based solely on sensor measurements taken at the vehicle 102.

Figure 6:
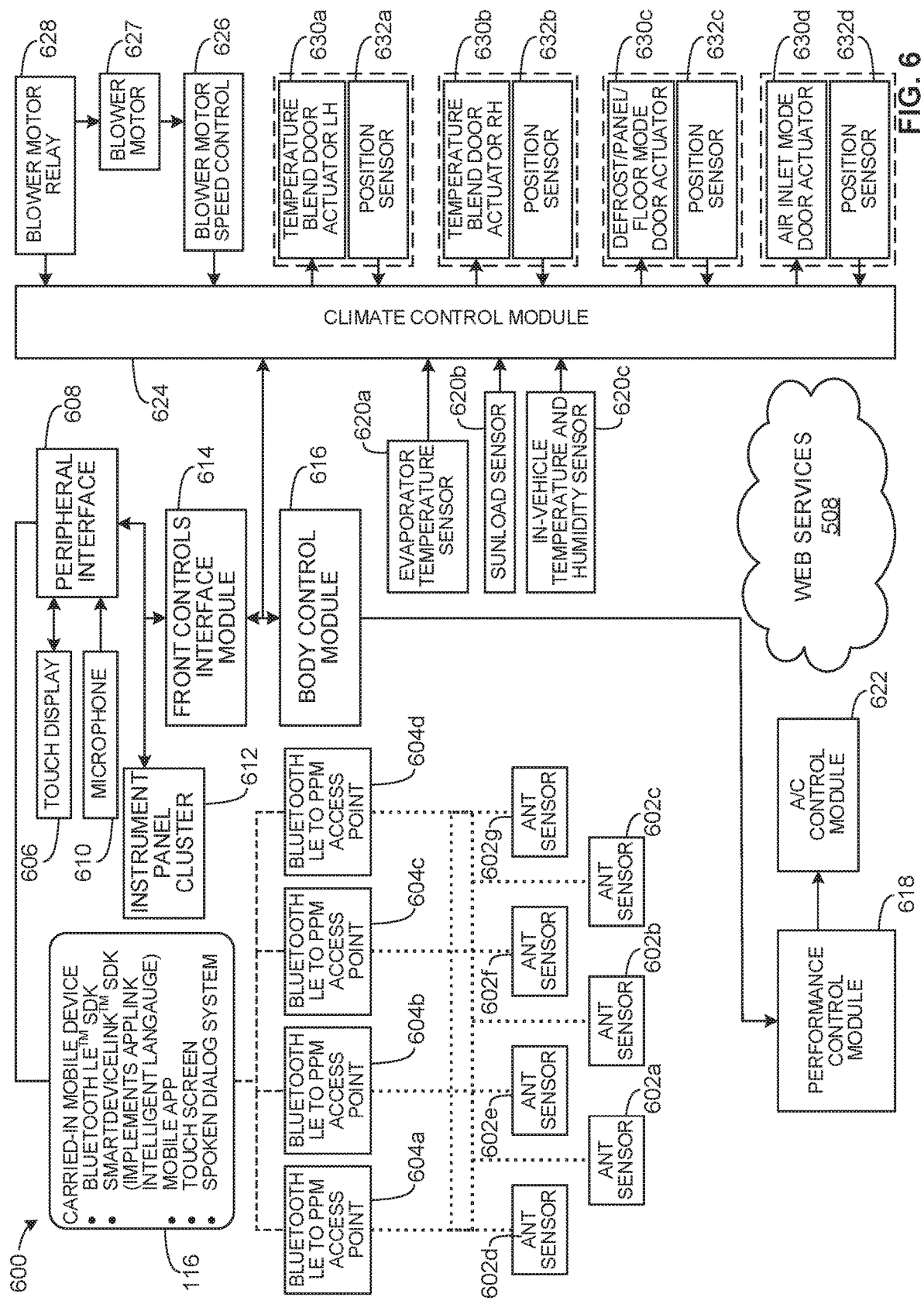
FIG. 6 is a schematic representation of a vehicle climate control system that may be implemented with the examples disclosed herein.

FIG. 6 is a schematic representation of a vehicle climate control system 600 that may be implemented with the examples disclosed herein. For example, the climate control system 600 may be implemented in the example climate control system 100 and/or by the climate control system components 200 described in connection with FIGS. 1 and 2. According to the illustrated example, the climate control system 600 is communicatively coupled to the mobile device 116 which, in turn, is communicatively coupled to the web services 508. In this example, the web services 508 provide virtual sensor information, driver/occupant preference data, and/or external condition data (e.g., weather information, traffic, external air conditions, pollution patterns, allergy/pollen information, etc.).

The climate control system 600 of the illustrated example includes external sensors 602a-c, internal sensors 602d-g, access points 604a-d, a touch display 606, a peripheral interface 608, a microphone 610, an instrument panel cluster 612, a front control interface module 614, a body control module 616, a performance control module 618, wired sensors 620a-c and an air conditioning control module 622. The example climate control system 600 also includes a vehicle climate controller (e.g., a climate controller module) 624 that is communicatively coupled to a blower motor speed control 626 which, in turn, is communicatively coupled to a blower motor 627 and a blower motor relay 628. In some examples, the blower motor relay 628 is also communicatively coupled to the body control module 616. According to the illustrated example of FIG. 6, the climate controller module 624 directs/controls actuators 630a-d having respective position sensors 632a-d. The distributed vehicle sensors 602 may correspond to any of the sensors 108 of FIG. 1, the access points 604 may correspond to any of the access points 106 of FIG. 1, the body control module 616 may correspond to the vehicle controller 104 of FIG. 1 and the climate control module 624 may correspond to the climate controller 112 of FIG. 1.

In operation, the access points 604 broadcast high frequency signals to the sensors 602, the sensors 602 become active, obtain measurements and transmit measurement data to the access points 604. In turn, the access point 604 that is nearest to each of the sensors 602 may receive the measurement data from that sensor 602 and send the measurement data to the mobile device 116, for example. The mobile device 116 may process this measurement data together with location information (e.g., the locations of the sensors 602) and/or information received from the web services 508 to generate one or more commands that are sent to the peripheral interface 608. The peripheral interface 608 transfers the one or more commands to the body control module 616. The one or more commands received by the body control module 616 may require that additional ventilation be provided to one or more of the locations associated with the sensors 602. Alternatively, the access points 604 may send the measurement data to the peripheral interface 608 directly.

In some examples, the body control module 616 facilitates the operation of the vehicle climate control system 600. For example, the body control module 616 may receive a command from the mobile device 116 to dry the carpet in the location 118 of the vehicle 102 illustrated in FIG. 1. In turn, the body control module 616 may prepare an instruction for the climate control module 624 to operate the climate control system 600, for example.

To control the climate control system 600, the climate control module 624 analyzes the instructions received from the body control module 616 to operate various components of the climate control system 600. For example, the climate control module 624 may analyze the instructions and determine that the vents 114d, 114c, the actuators 630a, 630b and the blower motor 627 are to be operated to change an environmental condition of the vehicle 102.

To change an environmental condition, the climate control module 624 powers the blower motor via the blower motor relay 628 and controls the blower motor speed control (e.g., the air conditioner blower motor speed control) 626 which, in turn, directs the blower motor 627. Further, in this example, the climate controller module 624 directs the actuators 630a, 630b to actuate the vents 114c, 114d to vary an environmental condition of a vehicle cabin (e.g., the cabin 110) near the location 118 of FIG. 1. In some examples any combination and/or portion of the actuators 630 are controlled (e.g., independently controlled).

In some examples, the body control module 616 may halt operation of the climate control system 600 based on performance data received from the performance control module 618. For example, the air conditioning control module 622 monitors an air conditioning compressor clutch to determine if pressure and/or temperature is too high while compressing refrigerant. In some examples, the air conditioning control module 622 may identify such a high pressure condition and send condition data to the performance control module 618. In turn, the performance control module 618 sends performance data to the body control module 614 and the body control module 616 may instruct the climate control system to halt operation to mitigate damage to the climate control system 600.

In other examples, the body control module 616 may identify the presence of a passenger. In examples when a passenger is present, prior to operating the climate control system 600, the body control module 616 may prompt the passenger via the touch display 606 to authorize the operation of the climate control system 600. The passenger may select a portion of the touch display 606 to authorize the request and/or audibly authorize the request using the microphone 610. If the request is authorized, the body control module 616 operates the climate control system 600. However, if the request is not authorized, the body control module 616 postpones the operation until the passenger is no longer in the vehicle.

In some examples in which a vehicle climate control system 600 is being upgraded/retrofitted to include functionality of the examples disclosed herein, a pre-existing peripheral interface may be replaced with the example peripheral interface 608 to incorporate wireless communications with and/or control the mobile device 116, for example. Additionally or alternatively, the mobile device 116 includes custom climate control software, custom climate control sensor interface(s) and/or a custom climate control software programming interface (e.g., an application programming interface (API)). Further, a sensor (e.g., a passive sensor, etc.) that is communicatively coupled to the access points 604, and thus the mobile device 116 may be placed, coupled and/or mounted within a cabin of the vehicle that is being upgraded/retrofitted without adding wiring and/or other internal components to support operation of the sensor, thereby enabling the enhancement of sensor capabilities and/or vehicle cabin analysis. For example, a vehicle manufacturer may provide a software interface on the mobile device 116 that allows an application developer unaffiliated with the manufacturer to develop an application that has some control of the climate control systems 100, 200 and/or 600.

Figure 7:
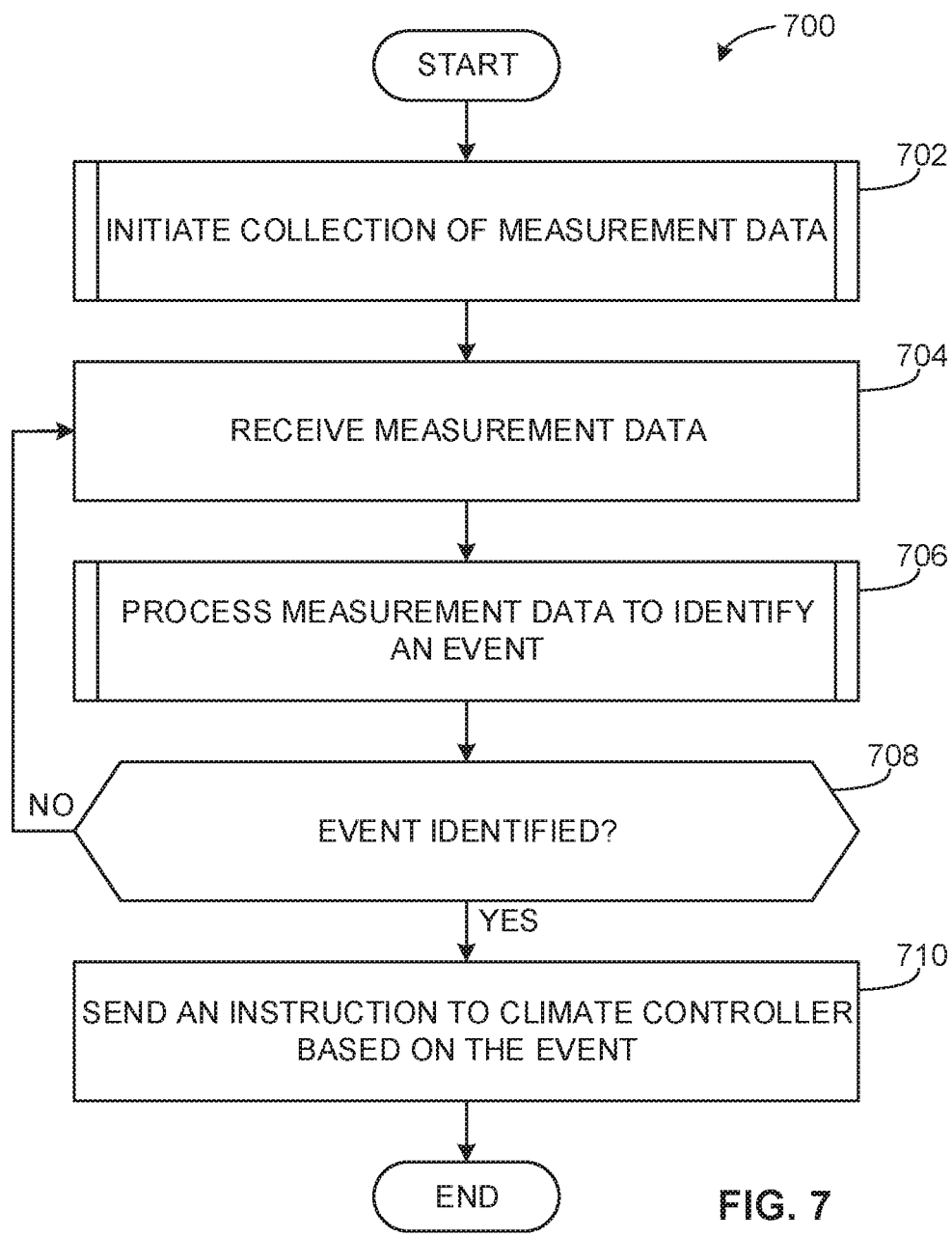
FIG. 7 is a flowchart representative of an example method that may be implemented by the example climate control system of FIG. 6.
Figure 8:
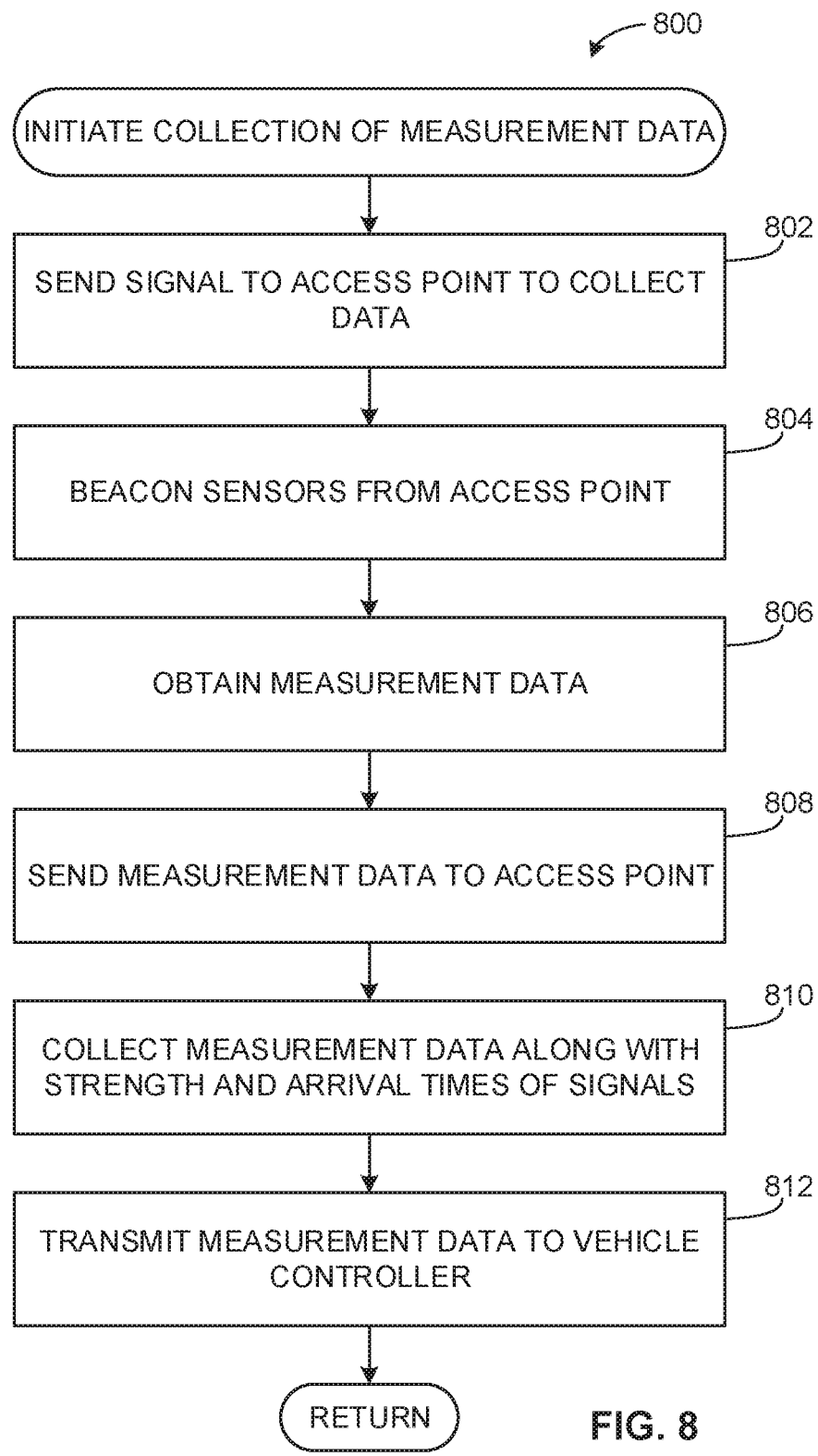
FIG. 8 is a flowchart representative of an example method that may be executed to perform the method of FIG. 7 to implement the example climate control system of FIG. 6.
Figure 9:
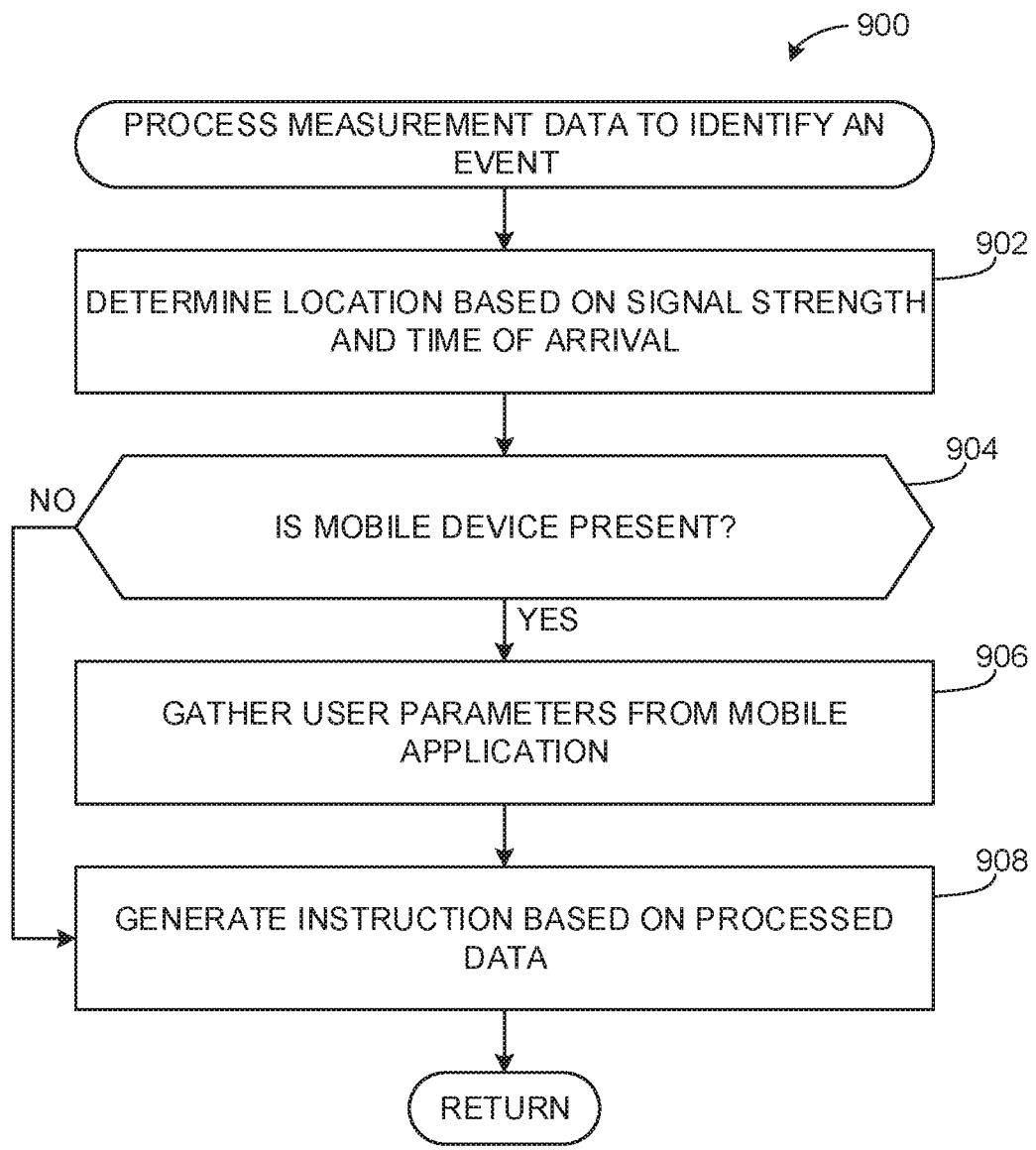
FIG. 9 is a flowchart representative of an example method that may be executed to perform the method of FIG. 7 to implement the example climate control system of FIG. 6.

Flowcharts representative of example methods for implementing the vehicle climate control systems 100, 200 and/or 600 of FIGS. 1, 2 and 6 are shown in FIGS. 7, 8 and 9. The example methods may be implemented using machine readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 7, 8 and 9, many other methods of implementing the example vehicle climate control systems 100, 200 and/or 600 may alternatively be used. For example, the order of execution of the blocks may be changed, and/or some of the blocks described may be changed, eliminated, or combined.

As mentioned above, the example methods of FIGS. 7, 8 and 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 7, 8 and 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 700 of FIG. 7 begins when the vehicle controller 104 initiates the collection of measurement data (block 702). In the illustrated example, the vehicle controller 104 receives the measurement data (block 704). After receiving the measurement data, the vehicle controller 104 processes the measurement data to identify an event (block 706). Next, it is determined if an event was identified (block 708). If an event was identified, the vehicle controller sends an instruction to the climate controller 112 based on the event (block 710). If an event is not identified, the process proceeds back to block 704. For example, the vehicle controller 104 may process the measurement data and identify a high number of pollutants near the external sensor 108k. In some examples, the vehicle controller 104 may instruct the climate controller 112 to operate in full recirculation mode.

FIG. 8 illustrates an example method 800 of performing the example processes of block 702 to initiate the collection of measurement data. The method 800 of FIG. 8 begins with the vehicle controller 104 sending a signal to the access points 106 to collect data (block 802). The access points 106 beacon the sensors 108 using high frequency signals (block 804). The high frequency signals power the sensors 108. In response to the beacon signals, the sensors 108 become active and obtain measurement data (block 806). The sensors 108 send the measurement data to the access points 106 (block 808). The access points 106 collect the measurement data along with strength and arrival time of the signal (block 810). The access points 106 then determine the locations of the sensors 108 using the strength and arrival times of the signals. The access points 106 transmit the measurement data to the vehicle controller 104 (block 812). The method 800 then returns to FIG. 7.

FIG. 9 illustrates an example method 900 of performing the example processes of block 706 to process the measurement data to identify an event. The method 900 of FIG. 9 begins when the measurement data is received from the access points 106. The vehicle controller 104 determines locations based on the signal strength and times of arrival (block 902). For example, the vehicle controller 104 may receive measurement data and location information (i.e., signal strength and arrival time) from access point 106c relating to the sensor 108d. The vehicle controller 104 identifies a location of the sensor 108d as being near the access point 106c. Next, the vehicle controller 104 determines if a mobile device is present (block 904). If a mobile device is present, the vehicle controller 104 gathers user parameters from a mobile device application (e.g., the preference selector 222) (block 906) and the vehicle controller 104 proceeds to generate an instruction based on the processed data (block 908). If a mobile device is not present at block 904, the vehicle controller 104 proceeds to generate an instruction based on the processed data. The method 900 then returns to FIG. 7.

Figure 10:
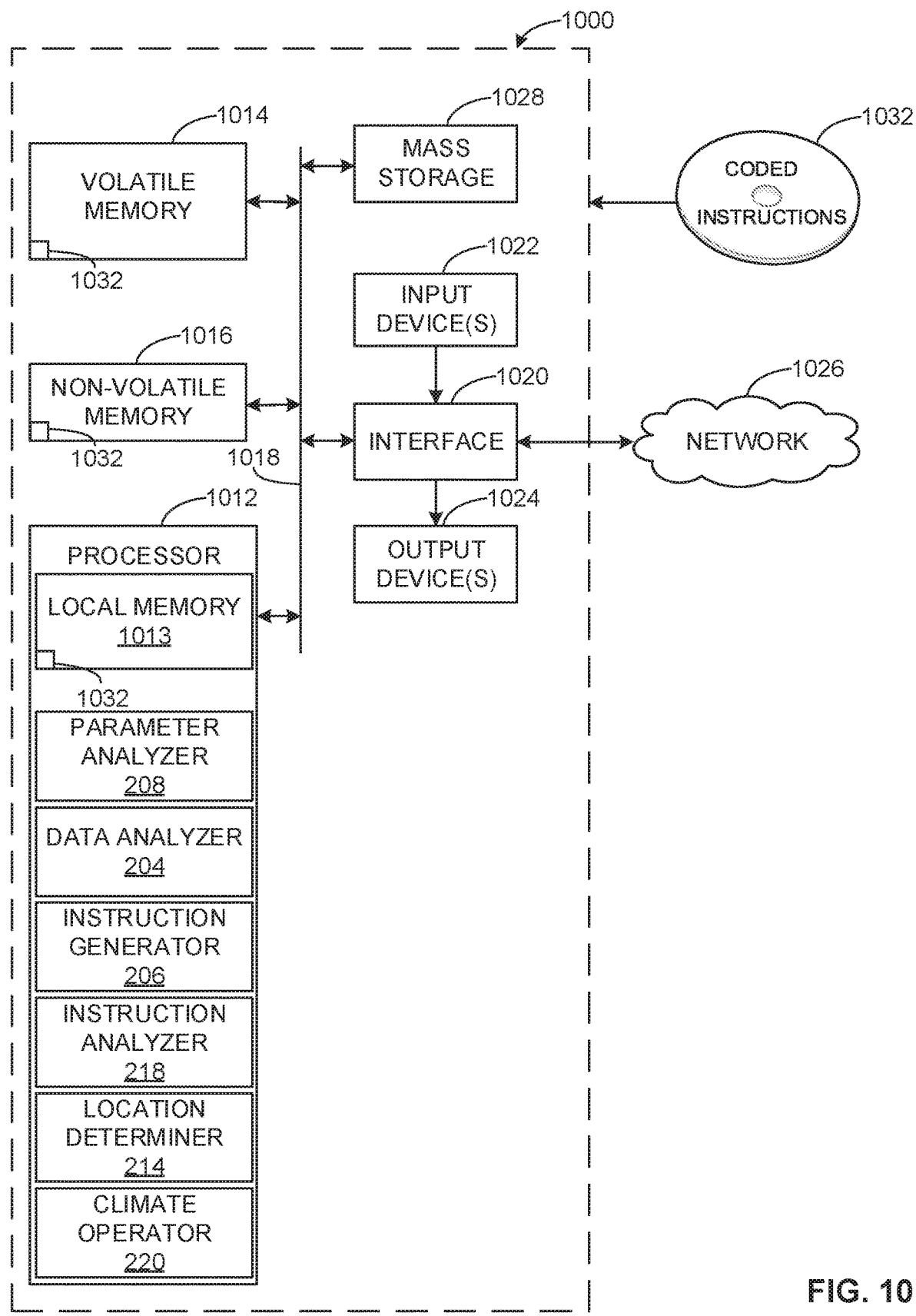
FIG. 10 is a processor platform that may be used to execute instructions to implement the methods of FIGS. 7, 8 and/or 9 and the example climate control system of FIG. 6.

FIG. 10 is a block diagram of an example processor platform 1000 capable of executing the instructions to implement the methods of FIGS. 7, 8 and 9 and the vehicle climate control systems of FIGS. 1, 2 and 6. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 to implement the methods of FIGS. 7, 8 and 9 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture enable more effective and customizable control of vehicle climate control systems. For example, the distributed sensors of the examples described herein are capable of detecting small, localized environmental events within a vehicle cabin as well as combining crowdsourced sensor information to mitigate or otherwise respond to the detected conditions or events more efficiently than wired sensors in current vehicles. For example, the sensors distributed throughout the vehicle cabin may be passively powered, wireless sensors that sense temperature(s), humidity, air contaminants or pollutants, etc. These distributed sensors may communicate with a controller of the vehicle via one or more access point devices, which serve to route the communications of the sensors and may also provide electrical power to the sensors via signals that are transmitted (e.g., broadcast) by the access points to the sensors. Additionally, the presence and location of a person (e.g., a driver, a passenger, etc.) may be detected using one or more of the sensors distributed throughout the cabin of the vehicle. For example, high radiant heat and/or carbon dioxide detected by sensors proximate the driver's seat may be used to determine that a person is located in the driver's seat. In these examples, the controller in the vehicle may prompt the detected person for any climate control preferences or may use default values associated with typical values found to be comfortable by the average person. Further, the examples disclosed herein enable a high degree of customization for additional functionality and/or capabilities (e.g., using new or different sensor technologies).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
accessing environmental condition data from sensors distributed within an interior of a vehicle at a first controller;
processing the environmental condition data at the first controller to identify an event associated with the interior of the vehicle; and
in response to the event corresponding to a humidity change indicative of a spilled liquid in a localized area of the vehicle, sending an instruction from the first controller to a second controller of the vehicle to cause a climate control system of the vehicle to direct at least one vent door to focus warm air towards a fabric in the localized area.

2. The method of claim 1, wherein processing the environmental condition data at the first controller includes locating the sensors within the vehicle to identify a location of the event.

3. The method as defined in claim 1, wherein the environmental condition data includes at least one of temperature data, humidity data, contaminant data, pollutant data, or chemical concentration data.

4. The method as defined in claim 3, wherein the instruction is sent in response to the temperature data (indicating a temperature in the interior of the vehicle associated with mold or bacteria growth.

5. The method as defined in claim 3, wherein the instruction causes the climate control system to operate in at least one of a recirculation mode or a dehumidification mode in response to the humidity data satisfying a first threshold and the temperature data satisfying a second threshold.

6. The method as defined in claim 3, wherein the spilled liquid is identified based on a change in the environmental condition data.

7. The method as defined in claim 1, wherein the localized area is a first localized area, and the humidity change causes a first humidity in the first localized area to be greater than a second humidity in a second localized area of the vehicle.

8. The method as defined in claim 1, wherein the instruction from the first controller to the second controller causes the climate control system to direct the at least one vent door to focus the warm air towards a floor or a seat in the localized area to dry the spilled liquid.

9. An apparatus comprising:
a first controller to:
access allergen data associated with an external environment that a vehicle is approaching from sources external to the vehicle;
process the allergen data to identify an environmental condition in the external environment; and
receive an occupant-specific allergen associated with an occupant of the vehicle; and
a second controller of the vehicle to affect an operation of a climate control system of the vehicle based on the environmental condition, the second controller to cause the climate control system to operate in a recirculation mode prior to the vehicle entering the external environment in response to the allergen data indicating that the occupant-specific allergen is present in the external environment.

10. The apparatus of claim 9, wherein the first controller is to identify a location of the external environment relative to the vehicle based on the sources.

11. The apparatus as defined in claim 9, wherein the sources include a web service.

12. The apparatus of claim 9, wherein the allergen data is a pollen count in the external environment.

13. The method of claim 1, wherein the instruction causes the second controller to operate a heater core and an evaporator to produce the warm air.

14. The method of claim 1, wherein the fabric is carpet.

15. A tangible computer-readable medium comprising instructions that, when executed, cause a processor to at least:
access humidity data from sensors distributed within an interior of a vehicle;
perform a comparison between the humidity data and one or more thresholds;
identify a liquid on a fabric in a localized area of the interior of the vehicle in response to the humidity data satisfying the one or more thresholds; and
cause a climate control system of the vehicle to focus a vent door on the fabric in the localized area and operate a heater core and a blower motor or a fan to cause warm air to flow through the vent door towards the fabric in the localized area.

16. The method of claim 1, further including prompting a passenger to authorize operations of the climate control system in response to detecting the humidity change indicative of the spilled liquid in the localized area.

17. The computer-readable medium as defined in claim 15, wherein the instructions, when executed, further cause the processor to measure signal strength and arrival time of high frequency signals to locate the sensors.

18. The method as defined in claim 1, wherein the instruction from the first controller to the second controller causes the climate control system to adjust an output of a blower motor or a fan to increase ventilation through the at least one vent door.

19. The computer-readable medium as defined in claim 15, wherein the instruction includes a location associated with the humidity data within the interior of the vehicle.

20. The computer-readable medium as defined in claim 15, wherein the instructions, when executed, cause the processor to:
- receive first user preferences from a first personal mobile device application;
- receive second user preferences from a second personal mobile device application; and
- in response to the first user preferences being different from the second user preferences, identify an environmental change to be implemented based on a social decision-making algorithm.

* * * * *

UNITED STATES PATENT AND TRADEMARK OFFICE
CERTIFICATE OF CORRECTION

Page 1 of 1

PATENT NO. : 11,634,006 B2
APPLICATION NO. : 16/487460
DATED : April 25, 2023
INVENTOR(S) : MacNeille et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this
Thirty-first Day of December, 2024

Derrick Brent
*Acting Director of the United States Patent and Trademark Office*